April 10, 1962     M. K. DAWSON     3,028,625
MOLD FILLING DEVICE
Filed March 17, 1959
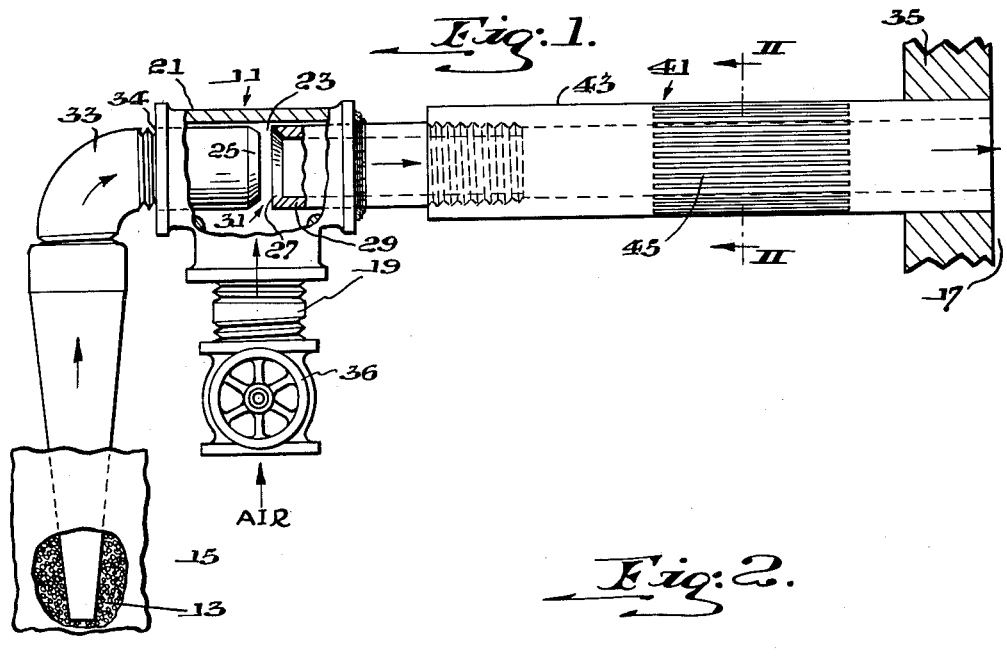
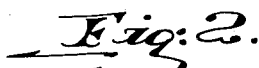
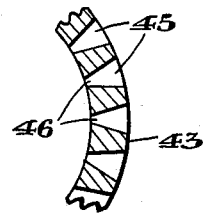
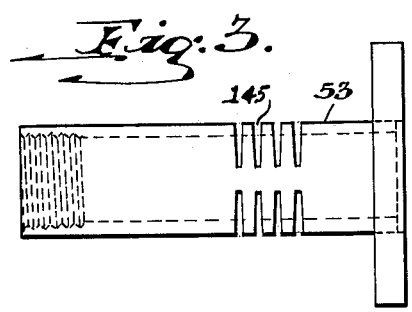
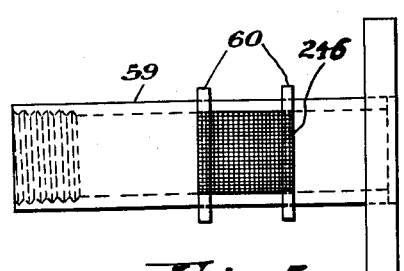
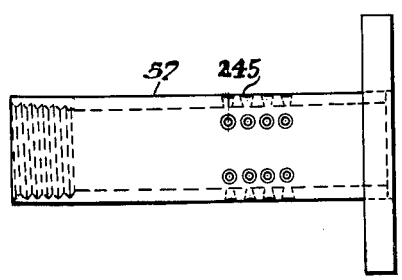
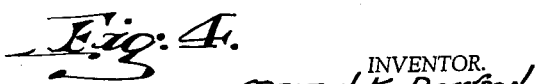
INVENTOR.
MILTON K. DAWSON.
BY C. Daniel Cornish
his
ATTORNEY

United States Patent Office 3,028,625
Patented Apr. 10, 1962

3,028,625
MOLD FILLING DEVICE
Milton K. Dawson, Beaver, Pa., assignor to Koppers Company, Inc., a corporation of Delaware
Filed Mar. 17, 1959, Ser. No. 799,932
2 Claims. (Cl. 18—5)

This invention relates generally to mold filling devices and more particularly to a mold filling device having an air acutated aspirator.

A foamed polymeric structure useable such as in the construction of building panels, insulation, etc. can readily be made, for example, by the process and apparatus described in application Serial No. 742,885 filed June 18, 1958 by E. A. Edberg and assigned to the assignee of this invention. In the apparatus described therein, an aspirator feeds beads, conveniently beads such as "Dylite" polystyrene beads made by Koppers Company, Inc. into a substantially closed mold where the heat from live steam expands the beads into a finished article having the shape of the mold. In the aspirator compressed air flows through an orifice nozzle into a venturi chamber thereby creating a partial vacuum or suction to lift or draw beads from a container and force the beads into the mold through a hole in its side so that the mold is completely filled. This technique of filling a mold is commonly known as "blow-filling."

While the foregoing apparatus worked well, certain difficulties, nevertheless, have been experienced. Large amounts of air were required to create the necessary suction in the aspirator and this forced large quantities of air into the mold. Unless these large quantities of air are released from the mold a back pressure built up, thus to make the aspirator inoperative. This is known as "back-flashing."

Heretofore, the means for venting of the aspirator air from the mold have been small vents in the sides of the mold and back-flashing occurred when the size or location of the vents did not permit sufficient escape of air from the mold. Insufficient venting also caused the filling time to be long. Increasing the size and location of the vents to prevent back-flashing or to decrease the time of filling the beads into the mold have not proved satisfactory because, when the vents were made larger or more numerous, steam used to expand the beads escaped from the mold to such an extent that the beads were incompletely expanded. Further, if the vents were made still larger to decrease the filling time, beads could be blown out of the mold.

This invention, therefore, provides a novel arrangement for filling the mold which arrangement eliminates the aforesaid disadvantages and additionally substantially eliminates the need for extensive and controlled venting of the mold.

More particularly, this invention provides an arrangement wherein air sucks beads from a container and forces the beads into a mold and is provided with a provision between the aspirator and the mold for venting air after passing through said aspirator but before entering into said mold.

The above and further objects and novel features of the invention will appear more fully from the following detailed description when the same is read in connection with the accompanying drawing. It is to be expressly understood, however, that the drawings are not intended as a definition of the invention but are for the purpose of illustration only.

FIG. 1 is an elevational view of an embodiment of the invention connected to the inlet of a mold.

FIG. 2 is a partial cross section through II—II of the apparatus of FIG. 2.

FIG. 3 is a side view of another embodiment of the novel vents.

FIG. 4 is a side view of another embodiment of the novel vents.

FIG. 5 is a side view of still another embodiment of the novel vents.

The invention comprises generally an aspirator 11, a substantially closed mold 35 and a connecting means 41 whereby beads flow into the mold 35 and air is released prior to its entrance into the mold.

Referring to FIG. 1 of the drawings, beads 13, advantageously polystyrene beads of about ⅛–1/16 inch diameter, are fed from a suitable container 15 such as a conventional plastic bag, into a substantially closed molding cavity, indicated generally as 17, of mold 35. The details of the mold except for the fact that it is substantially closed, are conventional and do not constitute a part of this invention and, therefore, are not shown herein. For details of a suitable mold reference is made to the aforementioned co-pending application Serial No. 742,885. The aspirator 11, which may be conventional, is illustrated herein as including a nipple 33 threaded into body 21 so as to provide means for adjusting the gap of orifice 23 formed by beveled shoulder 25 of nipple 33 and beveled shoulder end 27 of nipple 29. By fixing nipple 29 in body 21 coaxially of nipple 33, the beveled shoulders 25 and 27 form a venturi chamber 31. A suitable air source (not shown) such as 100 PSI plant air supply, supplies air to aspirator 11 through nipple 19. Pipe 33 threads into inlet 34 in body 21 so as to connect aspirator 11 with container 15, and a suitable pipe connected to nipple 29 which forms an outlet for aspirator 11 connects the aspirator 11 with closed molding cavity 17 formed by mold 35. Upon the opening of valve 36 air flows from a suitable air source (not shown) into aspirator 11 and through venturi chamber 31 where the flow of the air, as is well known, creates a partial vacuum or suction which draws beads 13 from container 15 through pipe 33, past orifice 23 into nipple 29. The rapid flow of air through nipple 29 carries with it the beads and imparts such a high velocity to the beads that the beads flow into mold cavity 17.

Heretofore, a problem had existed because unless air was released from the mold as rapidly as it flowed into the mold sufficient, back pressure was caused in the aspirator 11 which built up to a point that further action of the aspirator was stopped. This difficulty is overcome in accordance with this invention by the provision of a novel venting connector 41.

In accordance with this invention, connector 41 fixed to nipple 29, connects aspirator 11 with molding cavity 17 so as to transmit beads from aspirator 11 to cavity 17 and to vent to the atmosphere most of the air flowing through nipple 29 while preventing the escape of beads. Venting device 41 comprises a pipe 43 having openings 45 located downstream of nipple 29, far enough to prevent back suction of air therethrough into the pipe 43, advantageously about five inches from orifice 23, with a one inch aspirator inlet and outlet. Along the longitudinal axis of pipe 43 is provided an annular array of V shaped grooves 45 (FIG. 2) having end portions 46 adjacent the inside of pipe 43 and having sides forming between about a 15°–30° angle. Conveniently these grooves may be formed by milling. The width of end portions 46 may vary with the size of beads used. For example, a width of 1/32 of an inch has proved satisfactory when using beads varying in diameter from about ⅛ inch to 1/16 inch, to prevent the escape of beads through the openings 45. The angle of the sides of openings 45 may also vary, for example, angles of 60° having proved satisfactory but the narrower angles have the advantage of permitting more openings 45 around a given circumference of pipe 43.

In operation, the flow of air through aspirator 11 into nipple 29 sucks beads 13 from container 15 into nipple 29. This flow of air is at a high rate and it imparts a high velocity to the beads. Essentially the kinetic energy which is imparted to the beads by the air carries the beads through pipe 43 and into cavity 17. Due to this kinetic energy, the large volume of air needed to create a suction in the aspirator is not required to carry the beads into cavity 17. In accordance with this invention, therefore, after imparting the high velocity to the beads, most of the air passing through nipple 29 vents to the atmosphere through openings 45.

The form of openings 45 have an advantage of self cleaning. Although the beads used generally vary in size, some of the smaller beads may have a tendency to stick in openings 45. The impact of the multitude of beads traveling along the longitudinal axis of the openings, tends to free stuck beads and force them onwardly through pipe 43. On the other hand, if the stuck beads are not forced onwardly through pipe 43, the V shape of the openings permits air flowing through the openings 45 to carry the beads outwardly into the atmosphere. In practice, however, very few beads escape outwardly into the atmosphere and the self-cleaning feature of the venting device 41 has proven satisfactory.

Another embodiment of the invention having a novel arrangement for releasing air from the connecting venting means while permitting filling of mold 35, is shown in FIG. 3. This embodiment has tapered slots 145 or apertures extending transversely to the axis of pipe 53. These slots may be conveniently formed by merely sawing a pipe.

Another embodiment having a novel arrangement for releasing air from the connecting venting means while permitting filling of mold 35 is shown in FIG. 4. This embodiment has annular arrays of tapered drilled holes 245 around the circumference of pipe 57 formed by drilling.

Still another embodiment of this invention having a novel arrangement for releasing air from the connecting venting means while permitting filling of mold 35 is shown in FIG. 5. This embodiment has large slots cut in pipe 59 and screen wire held thereover by rings 60 so as to provide openings 246 for venting air after passing through nipple 29.

This invention has the advantage of filling beaded material into a substantially closed molding cavity while eliminating the problems of backflashing and long filling periods.

What is claimed is:

1. An apparatus comprising: a substantially closed molding cavity capable of being filled with expandable polymeric beads, an aspirator containing as an integral part thereof a venturi chamber and having a first inlet for the passage of said expandable polymeric beads into said aspirator, a second inlet for the passage of air under pressure into said aspirator, and an outlet for a mixture of said expandable polymeric beads and air, whereby said air under pressure passing through said venturi chamber sucks said expandable polymeric beads through said first inlet into said aspirator and ejects said mixture of beads and air from said outlet at a high velocity, longitudinally extending hollow connecting means for connecting said outlet with said substantially closed molding cavity, said hollow connecting means having a plurality of venting means extending substantially longitudinally to the axis of said connecting means, said venting means being tapered from the outside to the inside of said connecting means, having narrow portions of said taper adjacent the inside of said connecting means slightly smaller than the diameter of substantially all of said expandable polymeric beads, whereby most of the air passing through said outlet is vented to the atmosphere and said venting means are self-cleaning of the beads of sufficiently small diameter to pass through said venting means.

2. An apparatus comprising: a substantially closed molding cavity capable of being filled with expandable polymeric beads, an aspirator containing as an integral part thereof a venturi chamber, a connecting means and an air supply means, said aspirator having a first inlet for said expandable polymeric beads, a second inlet through which air under pressure is passed into said aspirator, and an outlet for said expandable polymeric beads and air, whereby air under pressure passing through said venturi chamber sucks polymeric beads into said first inlet and said mixture of air and beads is ejected from said outlet at a high velocity, longitudinally extending hollow connecting means for connecting said outlet and said substantially closed molding cavity, said connecting means having a plurality of venting means extending substantially longitudinally to the axis of said connecting means, said venting means being tapered to the inside from the outside of said connecting means and having narrow portions adjacent the inside of said connecting means which are slightly smaller than the diameter of substantially all of said expandable polymeric beads whereby most of the air passing through said outlet is vented to the atmosphere and said venting means are self-cleaning of the beads of sufficiently small diameter to pass through said venting means.

References Cited in the file of this patent

UNITED STATES PATENTS

| | | |
|---|---|---|
| 1,032,115 | Cook | July 9, 1912 |
| 1,082,113 | Diden | Dec. 23, 1913 |
| 1,597,438 | Ennis | Aug. 24, 1926 |
| 1,852,164 | Holzwarth | Apr. 5, 1932 |
| 2,066,993 | McCombs | Jan. 5, 1937 |
| 2,698,271 | Clark | Dec. 28, 1954 |